United States Patent
Konishi

[11] Patent Number: 5,898,926
[45] Date of Patent: Apr. 27, 1999

[54] CHANNEL SWITCHING SYSTEM FOR MOBILE COMMUNICATION

[75] Inventor: Osamu Konishi, Tokyo, Japan

[73] Assignee: NEC Corporation, Tokyo, Japan

[21] Appl. No.: 08/838,667

[22] Filed: Apr. 9, 1997

[30] Foreign Application Priority Data

Apr. 9, 1996 [JP] Japan .................................. 8/086302

[51] Int. Cl.⁶ .................................................. H04Q 7/00
[52] U.S. Cl. ............................ 455/441; 455/62; 455/450
[58] Field of Search ................................. 455/438, 440, 455/441, 444, 446, 450, 434, 515, 62, 63, 517; 370/331, 332

[56] References Cited

U.S. PATENT DOCUMENTS

| 5,396,645 | 3/1995 | Huff ........................................ 455/444 |
| 5,432,842 | 7/1995 | Kinoshita et al. ...................... 379/60 |
| 5,574,971 | 11/1996 | Aihara ................................... 455/441 |

FOREIGN PATENT DOCUMENTS

| 3-291027 | 12/1991 | Japan . |
| 4-070095 | 3/1992 | Japan . |
| 4-70095 | 3/1992 | Japan . |
| 290098 | 10/1992 | Japan . |
| 6-242225 | 9/1994 | Japan . |
| 8-331637 | 12/1996 | Japan . |
| 93/19560 | 9/1993 | WIPO . |

*Primary Examiner*—Thanh Cong Le
*Assistant Examiner*—Sam Bhattacharya
*Attorney, Agent, or Firm*—Foley & Lardner

[57] ABSTRACT

In a simplified portable telephone system having a small radius of a radio zone, a channel switching failure during high-speed movement or an instantaneous disconnection at the time of switching often occurs. Judgment is made upon whether a mobile station moves at high speed or low speed based on a degree of reduction in an electric field intensity of a channel currently used for a telephone call, and a radio base station having an electric field intensity, which is above a specified value and shows a largest increases is selected froze surrounding radio base stations which can be a target of channel switching during high-speed movement, thereby performing channel switching.

4 Claims, 8 Drawing Sheets

CHANNEL SWITCHING SYSTEM FOR MOBILE COMMUNICATION

BACKGROUND OF THE INVENTION

1. Field of the Invention

The present invention relates to a channel switching system for mobile communication, and more particularly to a channel switching system in the case where a simplified portable telephone terminal moves at high speed.

2. Description of the Related Art

In a mobile communication system in which a radio base station is arranged in each of a plurality of radio zones, a channel switching system for maintaining communication by switching a channel to a radio base station in a remote site is generally effected according to the following procedures when a mobile station moves between the radio base stations.

In the first place, it is detected that the mobile station has moved from, an area of the radio base station with which communication is currently carried out to an area of another radio base station. The radio base station to which the mobile station has moved is then determined to reserve an idle channel in the determined radio base station. A communication channel of the radio base station is finally switched to that of the radio base station to which the mobile station has moved so that communication is directed with a new channel being allocated to the mobile station.

The trigger of channel switching is judged based on intensity of the electric field of the channels.

As an example to which the above-mentioned channel switching technique is applied, there are techniques disclosed in Japanese patent laid-open publication No. 4-70095 and 4-290098.

Figure 9:
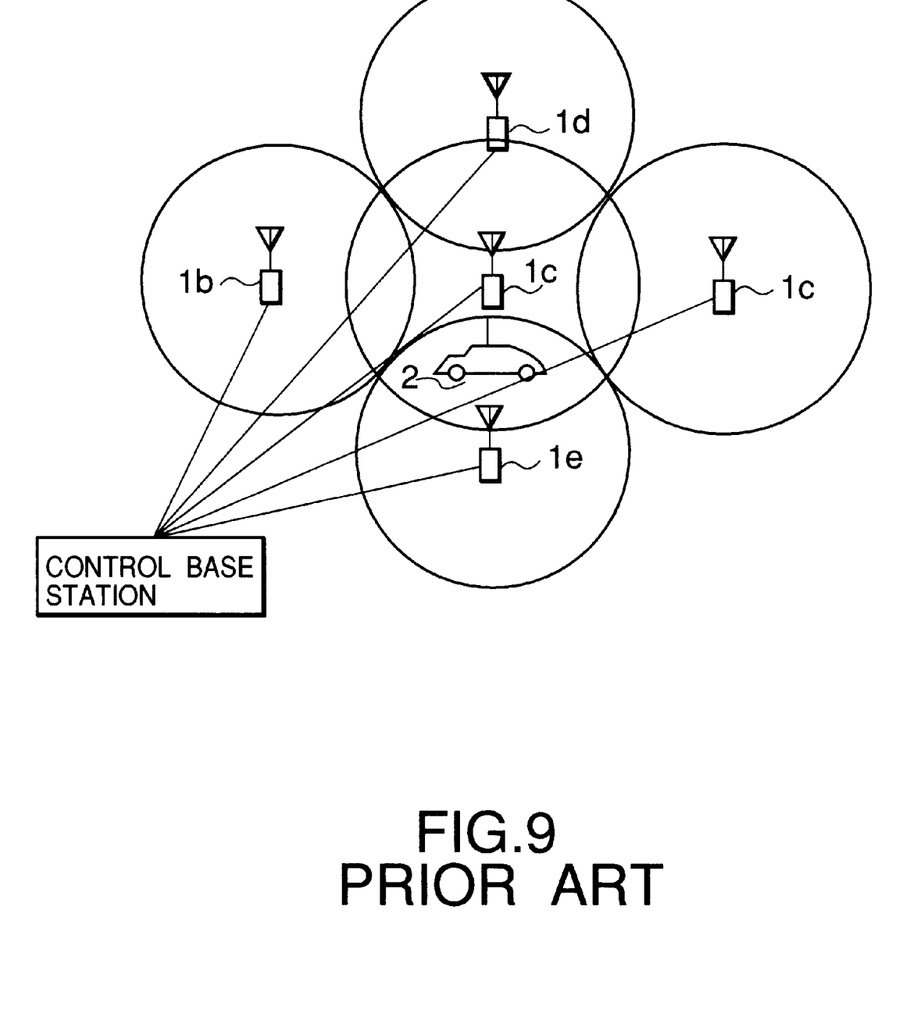
FIG. 9 is a block diagram for explaining a configuration of a prior art channel switching system.

FIG. 9 is a block diagram for explaining the technique disclosed in Japanese patent laid-open publication No. 4-70095. As shown in the drawing, a service area for mobile communication is constituted by a plurality of radio zones, wherein radio base stations 1a to 1e are provided in the respective radio zones and these radio base stations are connected with a control base station 4. A mobile station 2 communicates with one of these radio base stations and a currently-used channel is switched to another channel of a radio base station in a remote site as the mobile station 2 moves during communication. The channel switching control is performed in the following manner.

The radio base station currently communicating with the mobile station forecasts a radio base station to which the mobile station may subsequently move and informs the mobile station of information about that radio base station. The mobile station which has received the information monitors a receiving level of a control channel of the predicted radio base station to which the mobile station may subsequently move. When the receiving level of the channel from the currently-used radio base station is lowered whereas the receiving level of the channel of the predicted next radio base station which has been monitored increases above a predetermined value, the mobile station requests the radio base station to carry out channel switching and continues communication with the new radio base station.

Figure 10:
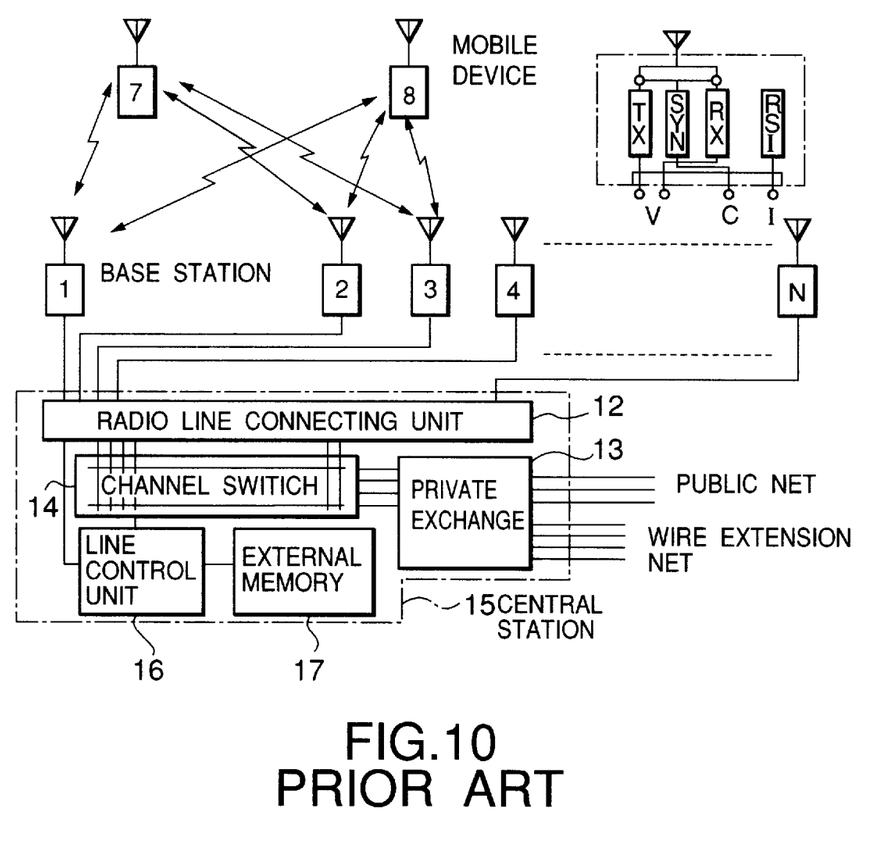
FIG. 10 is a block diagram for explaining another configuration of a prior art channel switching system.

Further, FIG. 10 is a black diagram for explaining the technique disclosed in Japanese patent laid-open publication No. 4-290098. This technique is such that a plurality of base stations 1 to N are connected with a central station 15 and channel switching is appropriately effected to maintain communication when a mobile device moves between cells formed by the respective base stations. The central station 15 previously stores the receiving electric field intensities at boundaries between the respective cells. A plurality of the base stations measure an electric field intensity of the mobile device to calculate a position of the device, and hence a time taken by the mobile device to reach a boundary between the cells can be calculated to judge a degree of urgency for performing channel switching. The channels are then sequentially switched by determining their priority according to the degree of urgency.

As described above, although various techniques in regard of channel switching system in the mobile communication system have been disclosed, all of them premise to switch to a channel of the radio base station having the strongest electric field intensity.

A transmitting output of a simplified portable telephone typified by a Personal Handy phone System(PHS) is extremely smaller than that of a general portable telephone, and the service area of the radio base station for the simplified portable telephone is so narrow as 150 to 300 meter. In case of adopting a system for changing over to a radio base station having a strongest electric wave at the time of channel switching, if the mobile station moves at high speed, the mobile station has already passed that radio base station when channel switching is performed and channel switching is thereby failed, which may result in disconnection of a phone call. In such a case, even if channel switching is succeeded, since the mobile station passes multiple radio base stations in a short time and channel switching is therefore performed every time the mobile station passes each radio base station, instantaneous disconnection of a phone call due to channel switching often occurs, thereby disabling a satisfactory phone call.

SUMMARY OF THE INVENTION

In view of the above-described drawbacks, it is an object of the present invention to provide a channel switching system for mobile communication which can assuredly perform channel switching even when a simplified portable telephone terminal moves at high speed and reduce possibilities of instantaneous disconnection during a phone call by suppressing a name of times of channel switching as possible.

A channel switching system for mobile communication according to the present invention is characterized in that: a moving speed of a mobile station is judged from a ratio of reduction in a receiving electric field intensity of a channel currently used for a telephone call; receiving electric fields of a plurality of surrounding radio base stations are measured and information thereof is stored if a ratio of reduction above a predetermined ratio of reduction is detected; a radio base station having an electric field intensity above a specified value for enabling telephone call and having the stored electric field intensity which shows a largest increase is selected from a plurality of the surrounding radio base stations when the receiving electric field intensity of the channel currently used for a telephone call is lowered to a specified value for channel switching, thereby effecting channel switching.

A channel switching system for mobile communication according to the present invention comprises:

(1) receiving electric fiend intensity detecting means for detecting a receiving electric field intensity of a received electric wave of a radio base station;

(2) receiving electric field change ratio calculating means for calculating a ratio of change in the receiving electric field per unit time based on the receiving electric field intensity detected by the receiving electric field intensity detecting means;

(3) memory means for storing information including a ratio of change in the receiving electric field intensity which can be a reference for judging a moving speed of the mobile station;

(4) moving speed judging means for comparing a ratio of change calculated by the receiving electric field intensity change ratio calculating means from the receiving electric field intensity of a channel currently used for a telephone call detected by the receiving electric field intensity detecting means with the ratio of change in the receiving electric field intensity serving as a reference for judging a moving speed stores in the memory means, in order to judge the moving speed of the mobile station as a high speed or a low speed;

(5) channel switching controlling means for selecting a radio base station to which the channel is switched to control channel switching when the receiving electric field intensity of the channel currently used for a telephone call lowers to a specified value for channel switching, the channel switching system being characterized in that (6) the receiving electric field detecting means periodically detects electric field intensities of electric waves of a plurality of surrounding radio base stations and stores them in the memory means when the moving speed judging means judges the moving speed of the mobile station as a high speed; and (7) the channel switching controlling means performs channel switching by selecting from a plurality of the surrounding radio base stations a radio base station which has an electric field intensity above a specified value for enabling a telephone call and a receiving electric field intensity showing a largest increase calculated by the receiving electric field change ratio calculating means from the electric field intensity which is stored in the memory means and periodically measured, when the receiving electric field intensity of the channel currently used for a telephone call is lowered to a specified value for channel switching.

Further, a channel switching system for mobile communication according to the present invention adopting another means comprises input means for setting a moving speed mode of a mobile station to low-speed movement or high-speed movement, the channel switching system being characterized in that: receiving electric field information of a plurality of surrounding radio base stations is measured and stored when the input means sets the high-speed movement mode; and a radio base station having an electric yield intensity which is above a specified value for enabling a telephone call and having a stored electric field intensity which shows a largest increase is selected from a plurality of the surrounding radio base stations when the receiving electric field intensity of the currently-used channel lowers to a specified value for channel switching, thereby carrying out channel switching.

Furthermore, a channel switching system for mobile communication according to the present invention adopting still another means comprises:

(1) receiving electric field intensity detecting means for detecting a receiving electric field intensity of a received electric wave of a radio base station;

memory means for storing and accumulating the receiving electric field intensity detected by the receiving electric field intensity detecting means as receiving electric field intensity information;

receiving electric field change ratio calculating means for calculating a ratio of change in the receiving electric field intensity per unit time based on the receiving electric field intensity information stored in the memory means;

input means for setting a moving speed mode of a mobile station to low-speed movement or high-speed movement; and (5) channel switching controlling means for selecting a radio base station to which the channel is switched to control channel switching when the receiving electric field intensity of the currently-used channel lowers to a specified value for channel switching, the channel switching system being characterized in that:

(6) the receiving electric field detecting means periodically detects electric field intensities of electric waves of a plurality of surrounding radio base stations and stores the detected results in the memory means when the input means sets the high-speed movement mode; and (7) the channel switching means selects from a plurality of the surrounding radio base stations a radio base station having an electric field intensity which is above a specified value for enabling a telephone call and having a receiving electric field intensity which shows a largest increase which is calculated by the receiving electric field change ratio calculating means from the periodically-measured electric field intensity stored in the memory means when the receiving electric field intensity of the currently-used channel lowers to a specified value for channel switching, thereby carrying cut channel switching.

DETAILED DESCRIPTION OF THE PREFERRED EMBODIMENTS

A channel switching system for mobile communication according to the present invention will be described with reference to the drawings.

Figure 1:
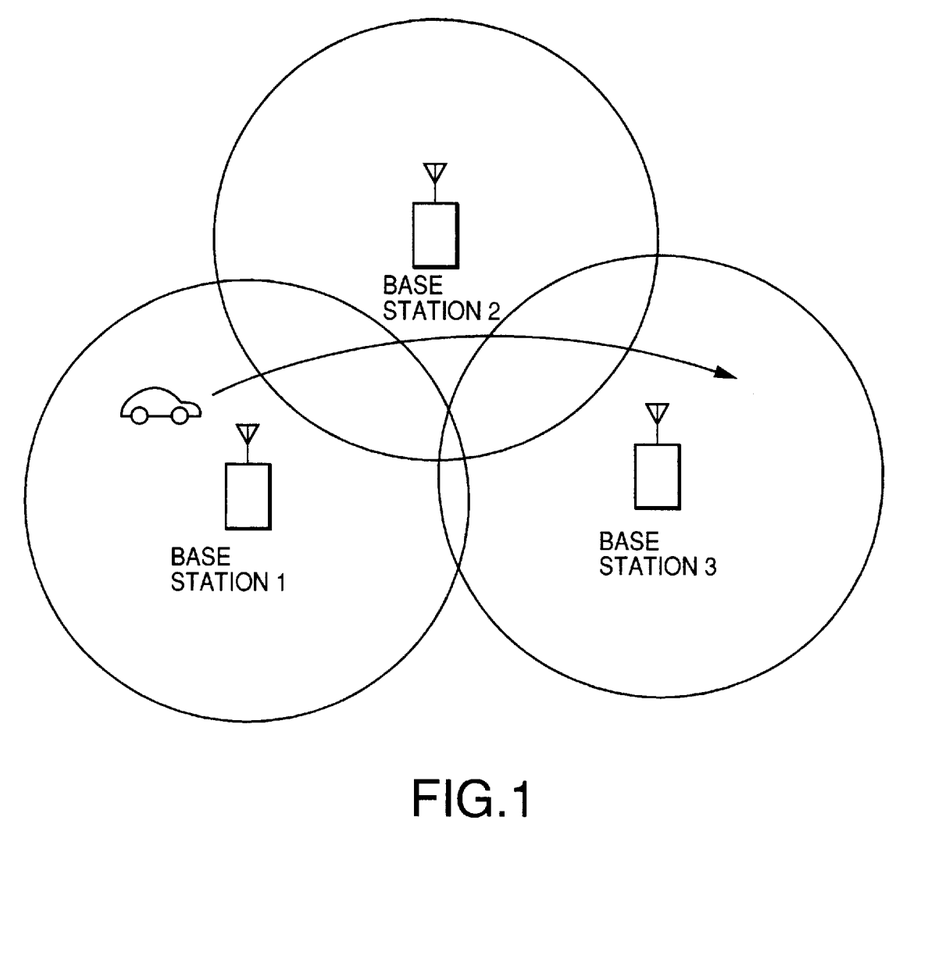
FIG. 1 is a conceptual view for explaining the state when moving in an area having a small radio zone radius at high speed.
Figure 2:
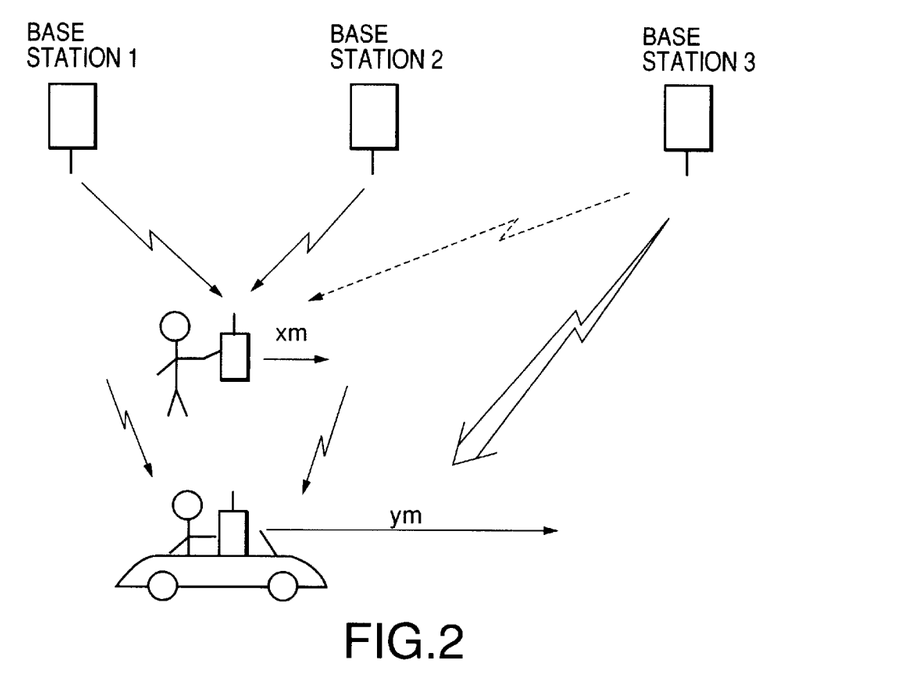
FIG. 2 is a conceptual view for explaining the state when moving in an area having a small radio zone radium at high speed.

As shown in FIG. 1, in the case where a carrier of a simplified portable telephone moves from a radio base station 1 to a radio base station 3 through a radio base station 2 by high-speed moving means such as a vehicle, assuming that a low speed when moving, e.g., on foot is x meters per second and a high speed is y meters per second as shown in FIG. 2, it is preferable to change a channel from the radio base station 1 to the radio base station 2 at the time of low-speed movement and change a channel from the radio base station 1 to the radio base station 3 at the time of high-speed movement. If a channel is similarly changed from the radio base station 1 to the radio base station 2 at the time of high-speed movement, since the carrier approaches to the radio base station 3 through the radio base station 2 when the channel was just switched, it is required to immediately switch the channel to the radio base station 3.

Figure 3:
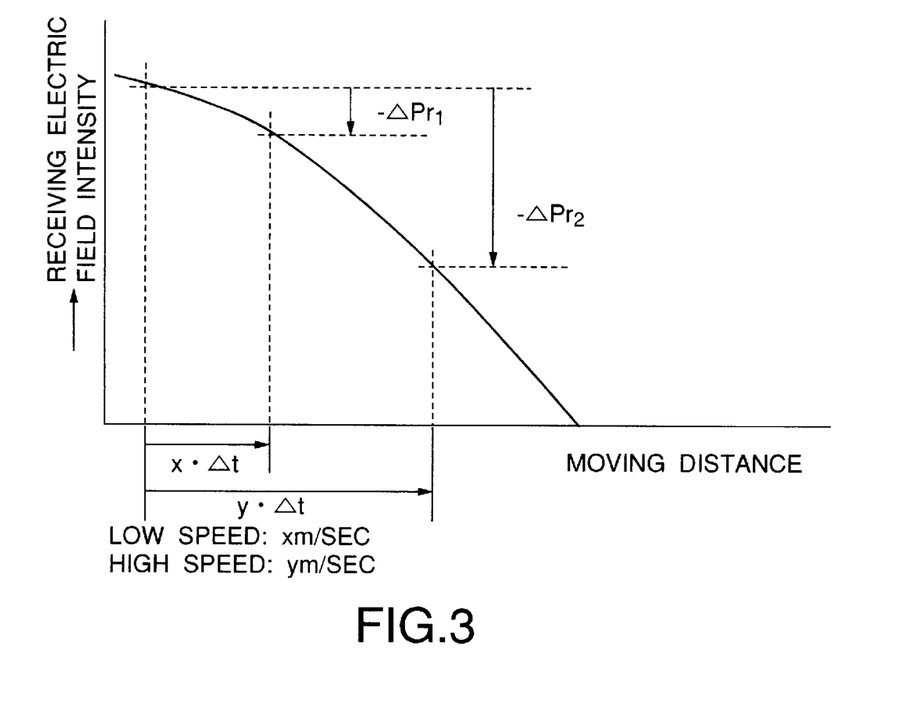
FIG. 3 is a graphic representation showing the state in which a receiving electric field intensity changes as a moving distance changes in order to explain the principle of the present invention.
Figure 4:
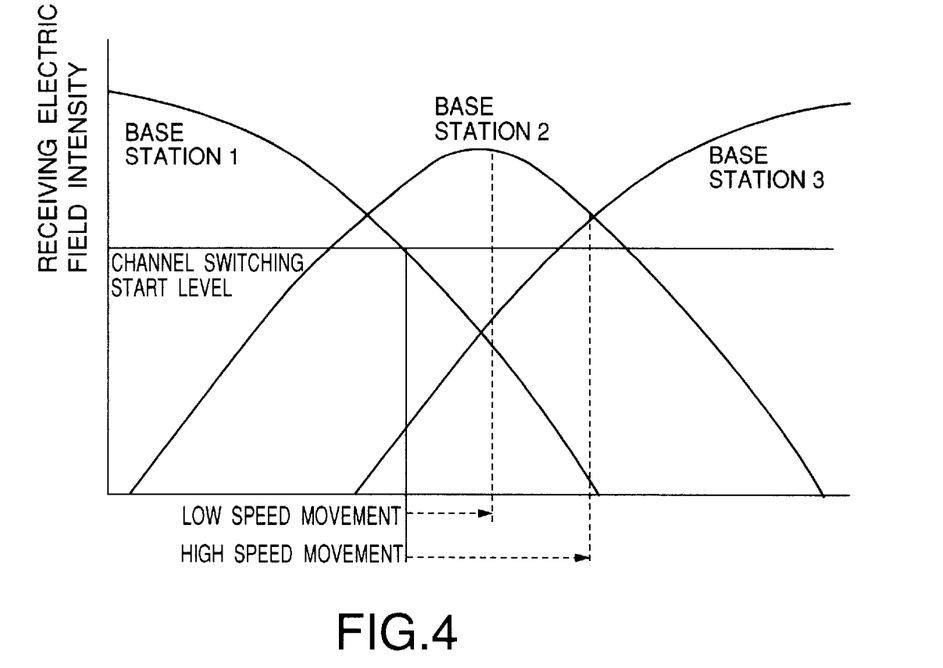
FIG. 4 is a graphic representation showing the state in which a receiving electric field intensity changes as a moving distance changes in terms of a relationship with surrounding radio base stations in order to explain the principle of the present invention.

FIGS. 3 and 4 are graphs showing the state in which the receiving electric field intensity changes according to a moving distance in, order to explain the principle of the present invention.

Referring to FIG. 3, it is assumed that, when the simplified portable telephone moves away from a given radio base station, the receiving electric field intensity lowers in proportional to a distance in the moving direction. Therefore, the electric field intensity lowers by $\Delta Pr1$ while the portable telephone moves a distance of $\Delta t \cdot x$ when the simplified portable telephone moves at low speed in $\Delta t$ seconds, and the intensity lowers by $\Delta Pr2$ while the portable telephone moves a distance of $\Delta t \cdot y$ when the same moves at high speed. It can be understood that reduction in the electric field intensity pier unit tome is larger when moving at high speed. Here, $\alpha$ for satisfying $\Delta Pr1 < \alpha < \Delta Pr2$ is determined, and it is judged that the carrier of the portable telephone moves it high speed when $\Delta Pr \geq \alpha$. In this manner, when controlling channel switching for the simplified portable telephone moving at high speed, it can be said that a radio base station to which the channel is switched from the radio base station currently used for a telephone call should be a radio base station having the electric field intensity which shows the largest increase instead of a radio base station having the strongest electric field intensity. As shown in FIG. 4, when moving at high speed, the radio base station 3 is therefore selected instead of the radio base station 2 as a radio base station to which the channel is switched, thereby performing channel switching.

Figure 5:
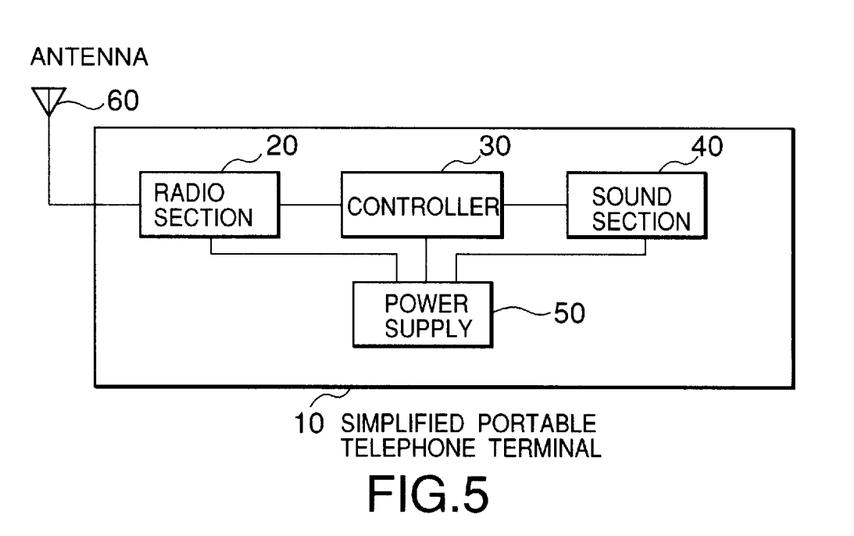
FIG. 5 is a block diagram showing a configuration of a simplified portable telephone terminal according to a first embodiment of the present invention.
Figure 6:
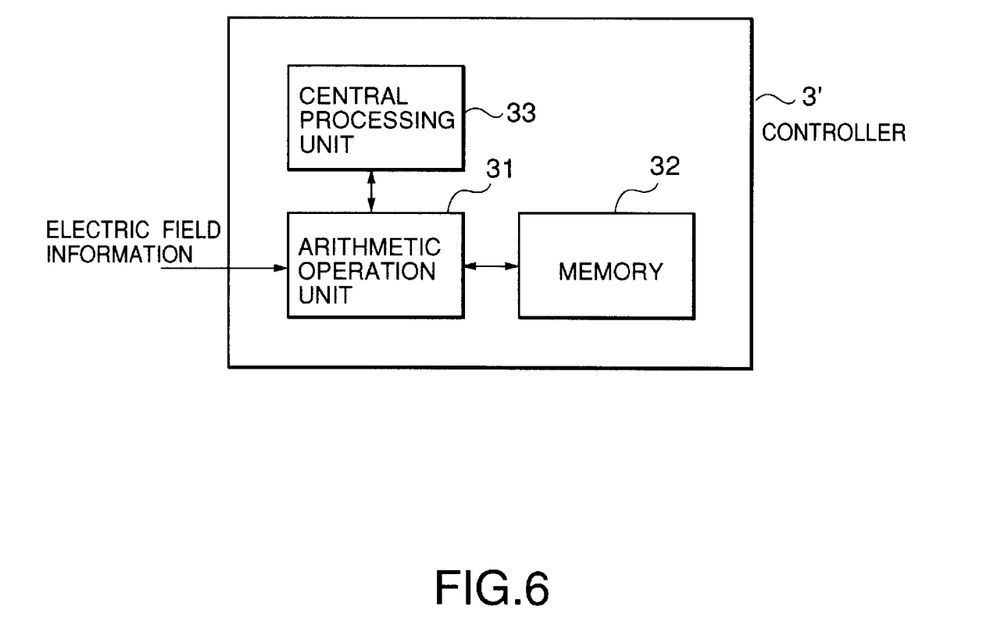
FIG. 6 is a block diagram showing the configuration of the simplified portable telephone terminal according to the first embodiment of the present invention.

FIGS. 5 and 6 are block diagrams showing the configuration of a simplified portable telephone terminal 10 according to a first embodiment of the present invention. A controller 30 in FIG. 5 constantly monitors changes in the electric field intensity by carrying out the arithmetic operation on the electric field information of the electric wave received by a radio section 20. Referring to FIG. 6 showing the configuration of the controller 30, the controller 30 includes an arithmetic operation unit 31 for obtaining a change in the electric field intensity by the arithmetic operation, a memory 32 in which a degree of reduction in the electric field intensity for judging discrimination of channel switching by high-speed movement from channel switching by low-speed movement is previously stored, and a central processing unit 33 for controlling a process for switching a channel.

Figure 7:
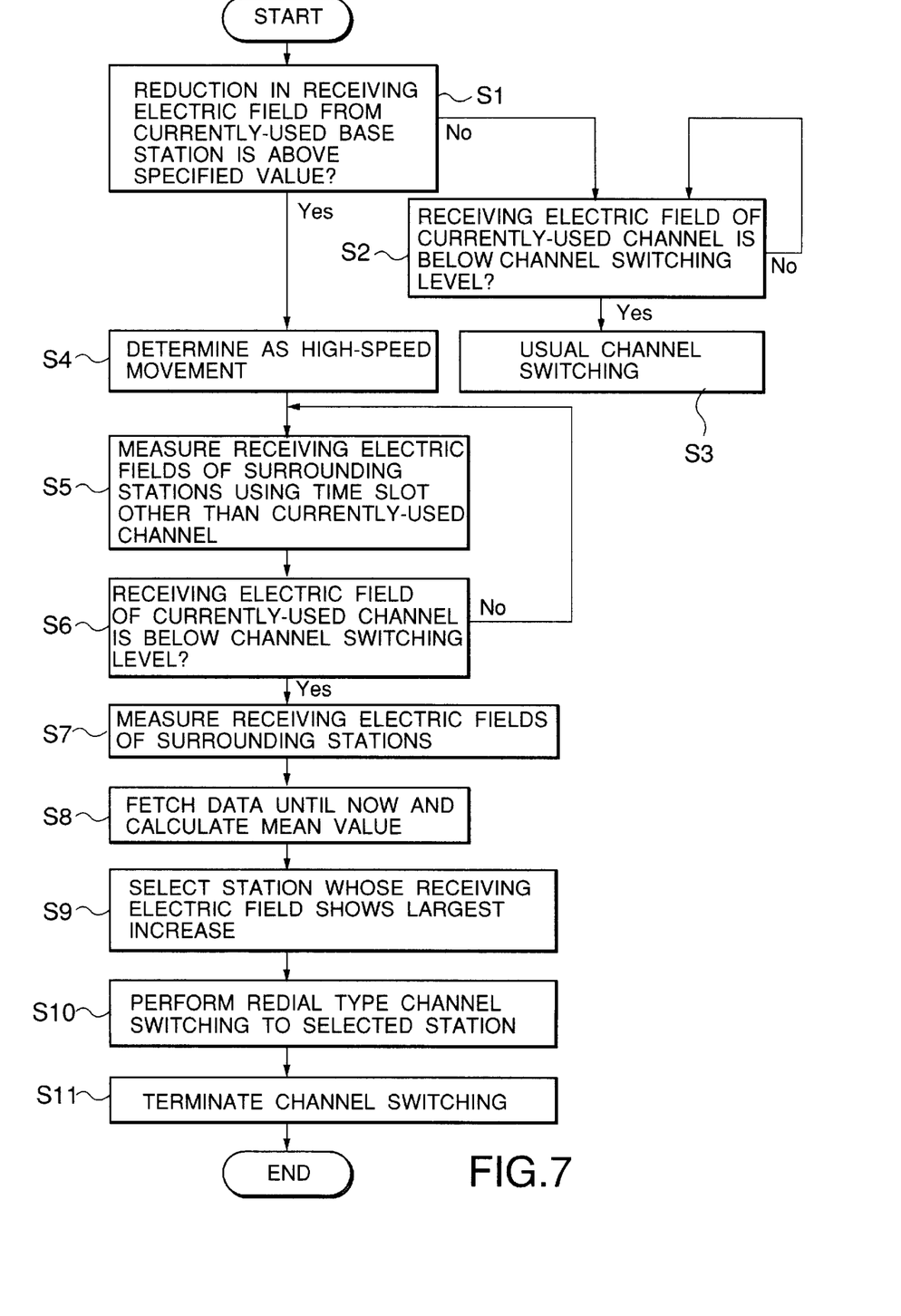
FIG. 7 is a flowchart for explaining the operation of the simplified portable telephone terminal according to the first embodiment of the present invention.

The operation of the simplified portable telephone terminal according to the first embodiment of the present invention will be described with reference to a flowchart of FIG. 7.

The arithmetic operation unit 31 constantly monitors reduction in the electric field intensity per unit time by executing the arithmetic operation on the electric field information of the electric wave received from the radio base station currently used for a telephone call. The arithmetic operation unit 31 compares a value of reduction in the electric field intensity obtained as a result of the arithmetic operation with a value of reduction in the electric field intensity which is previously stored in the memory 32 and serves as a reference for judging discrimination of the high-speed movement from the low-speed movement, and judges whether the simplified portable telephone terminal moves at high speed or low speed (s1). If it is judged that the terminal moves at low speed (s1: No), channel switching is carried out by usual means when the receiving electric field level of the currently-used channel is lowered below a reference value for channel switching (s2: Yes), and communication is thereby continued with a new radio base station.

On the other hand, if the electric field intensity is extremely reduced and it is judged that the simplified portable telephone terminal moves at high speed (s1: Yes, s2), the arithmetic operation unit 31 directs the central processing unit 33 to periodically collect information of the electric field intensities of the surrounding radio base stations (s5). A time slot other than the currently-used channel time slot is used for this measurement, and the collected electric field information is stored in the memory 32 when the receiving electric field level of the currently-used channel lowers and reaches the reference value for channel switching (s6: Yes), the arithmetic operation unit 31 directs to measure the receiving electric field intensities of the surrounding radio base stations (s7) and selects the radio base station having the electric field intensity, which is calculated from a result of measurement and the past electric field measurement information stored in the memory 32 and shows the largest increase, as a radio base station to which the channel is switched (s8 and s9). The central processing unit 33 is informed of the selected radio base station in order to perform channel switching with respect to the selected radio base station (s10 and s11).

Figure 8:
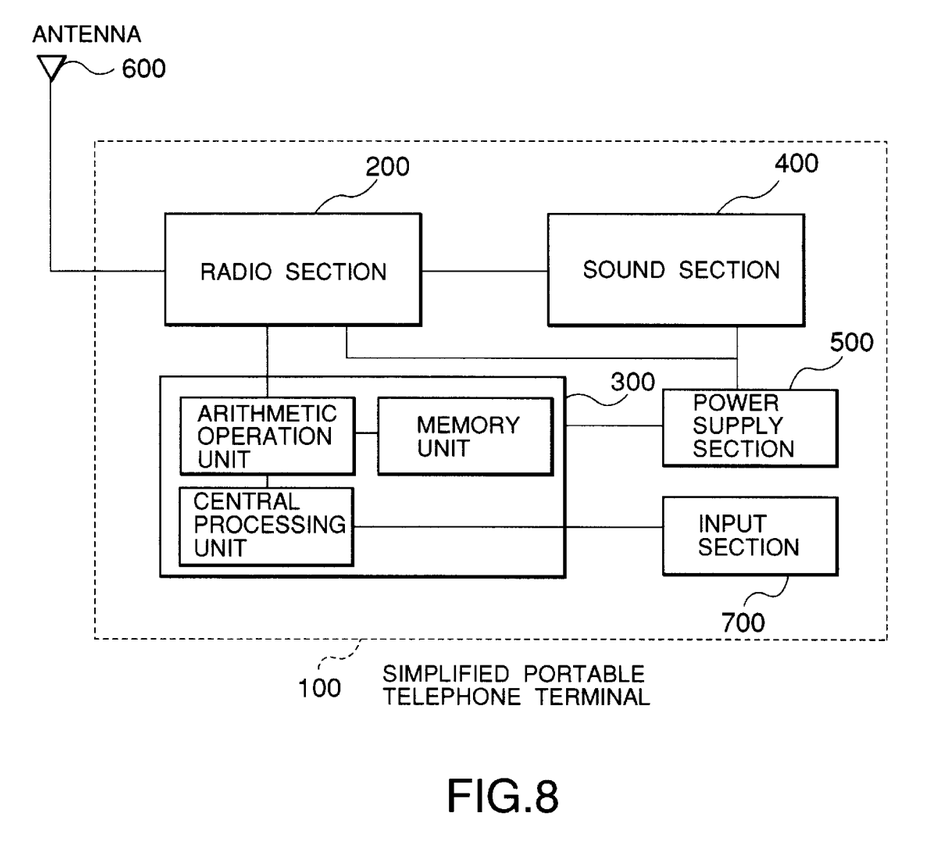
FIG. 8 is a block diagram showing a configuration of a simplified portable telephone terminal according to a second embodiment of the present invention.

FIG. 8 is a block diagram showing the structure of a simplified portable telephone terminal according to a second embodiment of the present invention. The simplified portable telephone terminal 100 according to the second embodiment has an input section 700 and is configured to enable selection of high-speed movement or low-speed by manual setting in advance. That is, the simplified portable telephone terminal only carries out channel switching in accordance with low-speed movement if low-speed movement is set by the input section 700, while the same only performs channel switching in accordance with high-speed movement if high-speed movement is set. Therefore, the process for judging whether the simplified portable telephone terminal moves at high speed or low speed can be eliminated, and hence the terminal can have a further-simplified structure, the process being effected in the simplified portable telephone terminal according to the first embodiment.

As described above, since the channel switching system according to the present invention selects a radio base station having the electric field intensity which is above a specified value and shows a largest increase from the surrounding radio base stations which can be a target to which the channel is switched, channel switching failures which may occur during high-speed movement can be reduced if a radius of the radio zone is small, thereby decreasing a number of times of channel switching. If a radius of the radio zone is small and the portable telephone terminal moves at high speed, it is advantageously possible to provide a service which can readily support the high-speed movement even though the terminal is a simplified portable telephone typified by a PHS which has many problems in case of the high-speed movement.

What is claimed is:

1. A channel switching system for mobile communication comprising;

receiving electric field intensity detecting means for detecting a receiving electric field intensity of a received electric wave of a radio base station;

receiving electric field change ratio calculating means for calculating a ratio of change in the receiving electric field intensity per unit time based on the receiving electric field intensity detected by the receiving electric field intensity detecting means;

memory means for storing information including a ratio of change in the receiving electric field intensity which can be a reference for judging a moving speed of the mobile station;

moving speed judging means for comparing the ratio of change which is calculated by the receiving electric field change ratio calculating means from the receiving electric field intensity of the currently-used channel detected by the receiving electric field intensity detecting means with the ratio of change in the receiving electric field intensity which is stored in the memory means and can be a reference for judging the moving speed in order to make judgment upon whether the moving speed of the mobile station is for low-speed movement or high-speed movement; and channel switching controlling means for selecting a radio base station to which the channel is switched to control channel switching when the receiving electric field intensity of the currently-used channel lowers to a specified value for channel switching, the channel switching method being characterized in that;

the receiving electric field detecting means periodically detects electric field intensities of electric waves of a plurality of surrounding radio base stations and stores the detected results in the memory means when the moving speed judging means determines that the moving speed of the mobile station is for the high-speed movement; and the channel switching controlling means selects from a plurality of the surrounding radio base stations a radio base station having an electric field intensity which is above a specified value for enabling a telephone call and having a receiving electric field intensity which shows a largest increase calculated based on the periodically-measured electric field intensity stored in the memory means by the receiving electric field change ratio calculating means, when the receiving electric field intensity of the currently-used channel lowers to a specified value for channel switching.

2. A portable telephone terminal comprising a channel switching system for mobile communication set forth in claim 1.

3. A channel switching system for mobile communication comprising:

receiving electric field intensity detecting means for detecting a receiving electric field intensity of a received electric wave of a radio base station;

memory means for storing and accumulating the receiving electric field intensity detected by the receiving electric field intensity detecting means as receiving electric field intensity information;

receiving electric field change ratio calculating means for calculating a ratio of change in the receiving electric field intensity per unit time based on the receiving electric field intensity information stored in the memory means;

input means for setting a moving speed mode of a mobile station to low-speed movement or high-speed movement; and channel switching controlling means for selecting a radio base station to which the channel is switched to control channel switching when the receiving electric field intensity of the currently-used channel lowers to a specified value for channel switching, the channel switching system being characterized in that;

the receiving electric field detecting means periodically detects electric field intensities of electric waves of a plurality of surrounding radio base stations and stores the detected results in the memory means when the input means sets the high-speed movement mode; and the channel switching means selects from a plurality of the surrounding radio base stations a radio base station having an electric field intensity which is above a specified value for enabling a telephone call and having a receiving electric field intensity which shows a largest increase which is calculated by the receiving electric field change ratio calculating means from the periodically-measured electric field intensity stored in the memory means when the receiving electric field intensity of the currently-used channel lowers to a specified value for channel switching, thereby carrying out channel switching.

4. A portable telephone terminal comprising a channel switching system for mobile communication set forth in claim 3.

* * * * *